(12) United States Patent
Yasutomi et al.

(10) Patent No.: US 8,499,730 B2
(45) Date of Patent: Aug. 6, 2013

(54) TWO CYCLE ENGINE AND TWO CYCLE ENGINE TOOL

(75) Inventors: Toshinori Yasutomi, Ibaraki (JP); Shinki Ohtsu, Ibaraki (JP); Junichi Kamimura, Ibaraki (JP); Shigetoshi Ishida, Ibaraki (JP)

(73) Assignee: Hitachi Koki Co., Ltd., Tokyo (JP)

( * ) Notice: Subject to any disclaimer, the term of this patent is extended or adjusted under 35 U.S.C. 154(b) by 681 days.

(21) Appl. No.: 12/540,295

(22) Filed: Aug. 12, 2009

(65) Prior Publication Data

US 2010/0037877 A1    Feb. 18, 2010

(30) Foreign Application Priority Data

Aug. 12, 2008    (JP) .................................. 2008-208284

(51) Int. Cl.
*F02B 25/00*    (2006.01)
(52) U.S. Cl.
USPC .................. 123/73 AA; 123/73 A; 123/65 W; 123/65 P; 123/73 PP
(58) Field of Classification Search
USPC ........ 123/73 A, 73 AA, 73 PP, 65 W, 65 WA, 123/65 P
See application file for complete search history.

(56) References Cited

U.S. PATENT DOCUMENTS

| | | | | |
|---|---|---|---|---|
| 4,711,201 A | * | 12/1987 | Ooyama et al. ............. | 123/73 A |
| 4,809,648 A | * | 3/1989 | Luo ........................... | 123/73 AA |
| 4,934,345 A | * | 6/1990 | Fukuoka et al. ......... | 123/73 AA |
| 5,067,453 A | * | 11/1991 | Takashima ................. | 123/193.6 |
| 6,289,856 B1 | * | 9/2001 | Noguchi ................... | 123/73 PP |
| 6,564,760 B2 | * | 5/2003 | Laydera-Collins ...... | 123/73 AA |
| 6,662,765 B2 | * | 12/2003 | Araki .......................... | 123/73 A |
| 8,065,981 B2 | * | 11/2011 | Ishida ....................... | 123/73 AA |
| 2006/0266310 A1 | * | 11/2006 | Yamaguchi ............... | 123/73 PP |
| 2006/0278183 A1 | * | 12/2006 | Mavinahally et al. ...... | 123/73 V |
| 2007/0028868 A1 | * | 2/2007 | Tsutsui ..................... | 123/73 PP |

FOREIGN PATENT DOCUMENTS

JP    2008-014209 A    1/2008

* cited by examiner

*Primary Examiner* — Noah Kamen
*Assistant Examiner* — Grant Moubry
(74) *Attorney, Agent, or Firm* — Kilpatrick Townsend & Stockton LLP

(57) ABSTRACT

The invention provides a two cycle engine which effectively suppresses an intrusion of a combustion gas into a crank chamber. Further, the invention provides a two cycle engine tool provided with the two cycle engine mentioned above. An engine is provided with a cylinder having two scavenge air ports at different positions in a cylinder circumference direction, and scavenge air inflow ports communicating individually with these two scavenge air ports via a scavenge air passage, and a piston in which two scavenge air communication ports are formed at positions corresponding to the scavenge air inflow ports, and is structured to swirl the gas flowing into the piston from the cylinder through the scavenge air passage, in an upper portion of the internal space of the piston, and retains the gas in the upper portion of the internal space of the piston.

9 Claims, 10 Drawing Sheets

TWO CYCLE ENGINE AND TWO CYCLE ENGINE TOOL

BACKGROUND OF THE INVENTION

1. Field of the Invention

The present invention relates to a two cycle engine, and more particularly to a two cycle engine which is suitable for a handheld tools powered by an engine such as a bush cutter, a chain saw, a blower and the like, and a two-cycle-engine-powered tool provided with the two cycle engine.

2. Description of the Related Art

Conventionally, there have been proposed a lot of inventions which relate to a two cycle engine reducing an outflow (blow-by) of an air-fuel mixture within a cylinder into an exhaust port, in a scavenging process.

For example, in Patent Literature 1, there is proposed a stratified scavenging two cycle engine which scavenges a combustion gas by making a lead air having flown into an internal space of piston through a lead air port and a lead air flow path in a suction stroke, and making the lead air flowing into the internal space of piston flow into a cylinder through a scavenge air communication port, a scavenge air inflow port, a scavenge air passage and a scavenge air port in a scavenging stroke.

Patent Literature 1: Unexamined Japanese Patent Application KOKAI Publication No. 2008-14209

As mentioned above, since the stratified scavenging two cycle engine proposed in the Patent Literature 1 scavenges the combustion gas by the lead air, it is possible to reduce the blow-by of the air-fuel mixture in the scavenging stroke. However, since a pressure within a cylinder (a combustion chamber) is higher than a pressure within the internal space of piston in an early stage of the scavenging stroke, there is a problem that the combustion gas within the cylinder flows backward to the internal space of piston through the scavenge air port, the scavenge air passage, the scavenge air inflow port, and the scavenge air communication port, and further intrudes into a crank chamber. Moreover, if the combustion gas makes an intrusion into the crank chamber, a concentration of the air-fuel mixture within the crank chamber is lowered. As a result, there is a problem that an output of an engine is lowered, and an amount of total hydrocarbons (THC) included in a discharge gas is increased.

SUMMARY OF THE INVENTION

The present invention is made by taking the problems mentioned above into consideration, and an object of the present invention is to provide a two cycle engine which effectively suppresses a reduction of an engine output and an increase of total hydrocarbons (THC) in a discharged gas which are caused by an intrusion of a combustion gas into a crank chamber. Further, the other object of the present invention is to provide a two cycle engine tool provided with the two cycle engine mentioned above.

In order to achieve the object mentioned above, according to the present invention, there is provided a two cycle engine comprising:

a cylinder having an intake port introducing an air-fuel mixture into a crank chamber, an exhaust port discharging a combustion gas within a combustion chamber, a scavenge air port, a scavenge air inflow port, and a scavenge air passage by which the scavenge air port communicates with the scavenge air inflow port;

a piston having an internal space and a scavenge air communication port, and structured such that the air-fuel mixture within the crank chamber flows into the combustion chamber from the internal space through the scavenge air communication port, the scavenge air inflow port, the scavenge air passage and the scavenge air port; and a retention section provided in the piston or the cylinder, and retaining, in the vicinity of a top of the internal space, the combustion gas flowing backward to the internal space of the piston from the combustion chamber through the scavenge air port, the scavenge air passage, the scavenge air inflow port and the scavenge air communication port.

The retention section is constructed, for example, by a whirling flow generating section swirling, along a circumference direction in an inner side of the piston, the combustion gas flowing into the internal space through the scavenge air communication port.

The whirling flow generating section may be constructed by a pair of the scavenge air inflow ports arranged in an opposing manner in such an opposing manner that the combustion gas flowing backward to the internal space flows in inverse direction to each other, and axes of the pair of scavenge air inflow ports may be offset from each other as viewed from an axial direction of the cylinder.

Alternatively, the whirling flow generating section may be constructed by a pair of scavenge air communication ports arranged in such an opposing manner that the combustion gas flowing backward to the internal space flows in inverse direction to each other, and axes of the pair of scavenge air communication ports may be offset from each other in the case of being viewed from an axial direction of the cylinder.

Alternatively, the whirling flow generating section may be constructed by a pair of the scavenge air communication ports arranged in such an opposing manner that the combustion gas flowing backward to the internal space flows in a direction inverse to each other and a flow guide plate arranged in the vicinity of the scavenge air communication port of the internal space is provided, and the flow guide plate may guide the combustion gas in such a manner that the flows of the combustion gases flowing from the pair of scavenge air communication ports are offset from each other as viewed from an axial direction of the cylinder.

Further, the scavenge air communication port may be formed to have such an inclination that an end surface close to the internal space comes closer to a top dead center of the piston in comparison with an end surface close to the scavenge air inflow port.

Alternatively, the scavenge air passage may be formed to have such an inclination that the combustion gas flowing backward to the internal space from the scavenge air inflow port heads for a direction of a top dead center of the piston.

Alternatively, the two cycle engine according to the present invention may be structured such that a lead air port is further provided at a position which comes closer to a top dead center than the intake port of the cylinder, the piston is provided with a lead air flow path that is connected to the lead air port and introduces the lead air flowing from the lead air port to an internal space of the piston is further provided, and the lead air flows into the cylinder from the scavenge air port through the scavenge air communication port, the scavenge air inflow port and the scavenge air passage, and, in succession, the air-fuel mixture within the crank chamber flows into the cylinder from the scavenge air port through an inner portion of the piston, the scavenge air communication port, the scavenge air inflow port, and the scavenge air passage while the scavenge air communication port and the scavenge air inflow port overlap in an exhaust stroke.

Further, a two cycle engine tool according to the present invention is provided with the two cycle engines.

According to the present invention, since the combustion gas flowing backward to the internal space of piston is held in the internal space of piston, thereby preventing the combustion gas from making an intrusion into the crank chamber, it is possible to effectively suppress the reduction of the output of the two cycle engine and the increase of the total hydrocarbons (THC) in the discharged gas. Further, it is possible to achieve a clean and powerful two cycle engine tool.

BRIEF DESCRIPTION OF THE DRAWINGS

These objects and other objects and advantages of the present invention will become more apparent upon reading of the following detailed description and the accompanying drawings in which.

DETAILED DESCRIPTION OF THE PREFERRED EMBODIMENTS

A description will be given below of a best mode for carrying out the present invention with reference to the attached drawings.

Figure 1:
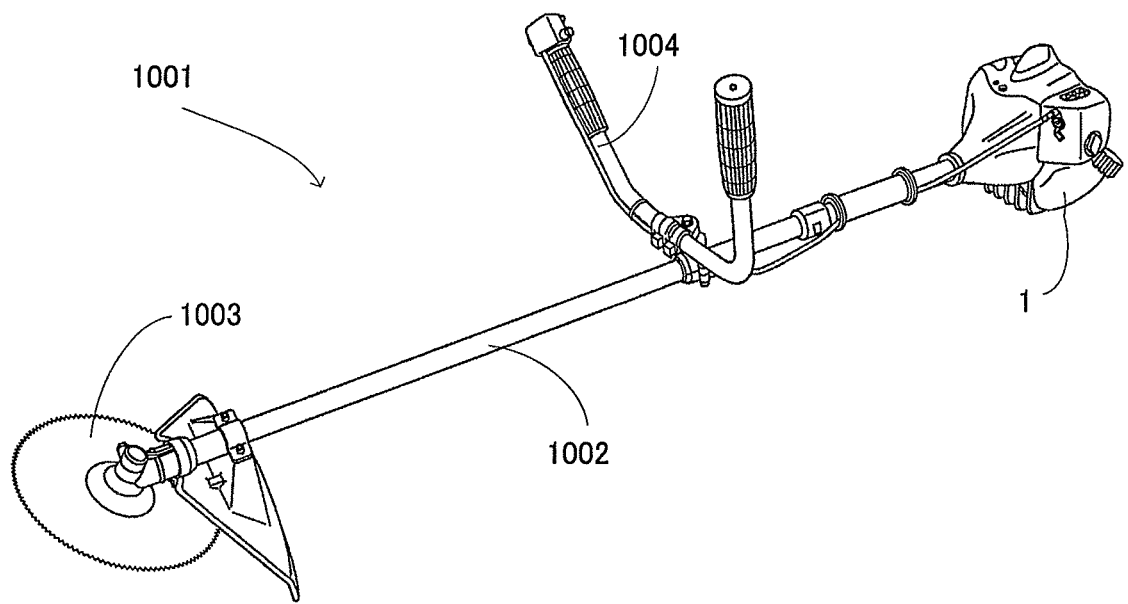
FIG. 1 shows an exterior of a bush cutter according to an embodiment of the present invention.

FIG. 1 shows the exterior of a bush cutter 1001 on which a two cycle engine (hereinafter referred to as an engine) 1 according to the present invention is mounted. As shown in FIG. 1, a rotary blade 1003 is attached to a front end of a control rod 1002 of the bush cutter 1001, and an engine 1 is attached to a rear end of the control rod 1002. The power of the engine 1 is supplied to the rotary blade 1003 via a drive shaft that is inserted into the control rod 1002. An operator grips a handle 1004 attached to the control rod 1002 to operate the bush cutter 1001.

A description will be given of a structure of the engine 1 with reference to FIGS. 2 to 6.

Figure 2:
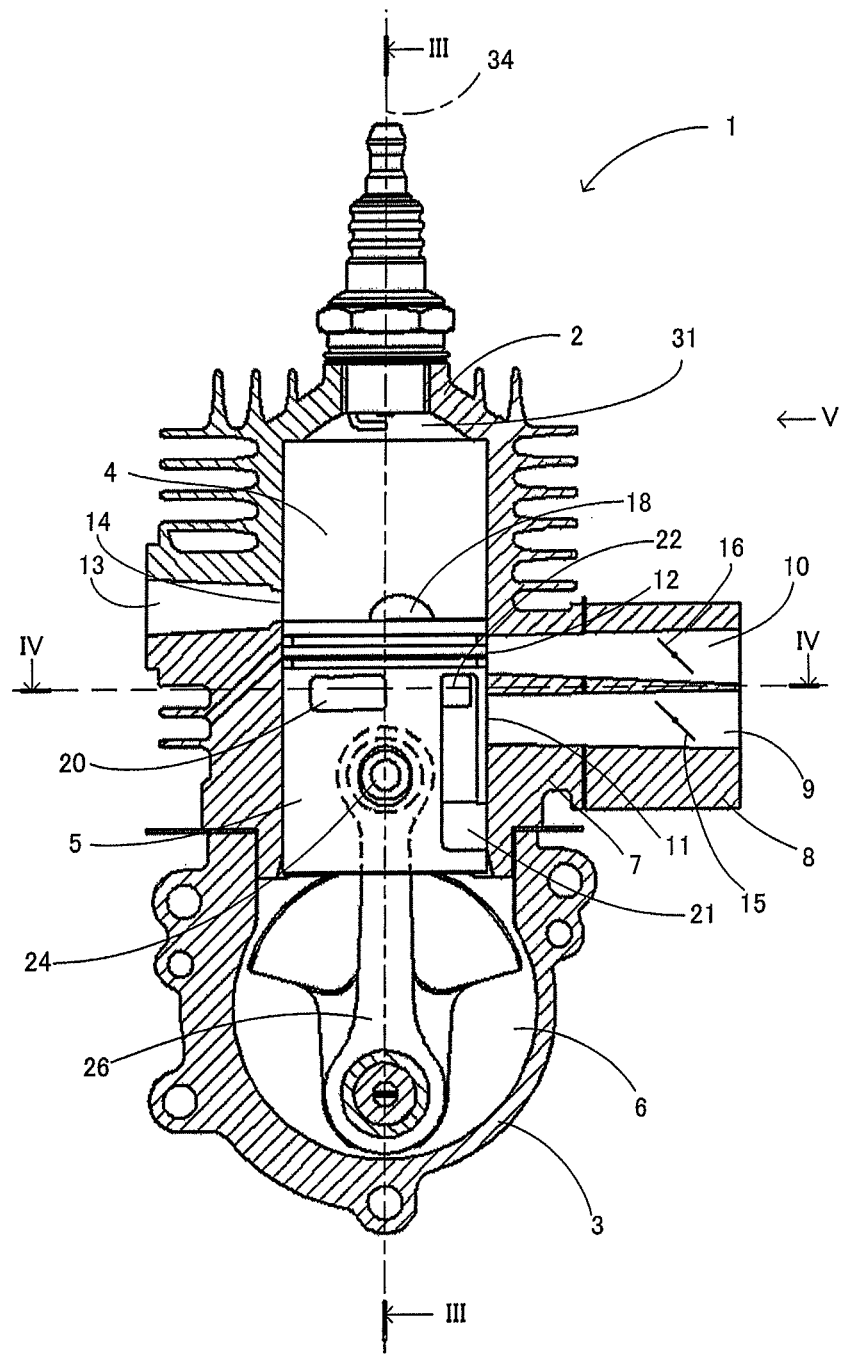
FIG. 2 shows an elevated view in section of an engine according to an embodiment of the present invention.

FIG. 2 is an elevated view in section cutting the engine 1 by a plane including a center line equally dividing the exhaust port 14 in a circumference direction of the cylinder 4 and a cylinder axis 34. As shown in FIG. 2, a crank case 3 is attached to a cylinder block 2 of the engine 1. A piston 5 travels reciprocally in a direction of a cylinder axis 34 (up and down) within a cylinder 4 of the cylinder block 41 (FIG. 2 shows a state in which the piston 2 reaches a bottom dead center). Further, a lower side of the cylinder 4 is connected to a crank chamber 6 within the crank case 3. A carburetor 8 is connected to a side portion of the cylinder block 2 via an insulator 7. An intake passage 9 and a lead air passage 10 are formed in an inner portion of the insulator 7 and the carburetor 8. The intake passage 9 communicates with the cylinder 4 via an intake port 11, and supplies an air-fuel mixture to an inner portion of the cylinder 4. Further, the lead air passage 10 communicates with the cylinder 4 via a lead air port 12, and supplies a lead air to the inner portion of the cylinder 4. Further, an exhaust passage 13 is formed in a side opposite to the intake passage 9 (and the lead air passage 10) beyond a cylinder axis 34 in the cylinder block 2. The exhaust passage 13 communicates with the cylinder 4 via an exhaust port 14. In this case, an intake valve 15 and an air valve 16 are provided respectively in the intake passage 9 and the lead air passage 10 of the carburetor 8.

Figure 3:
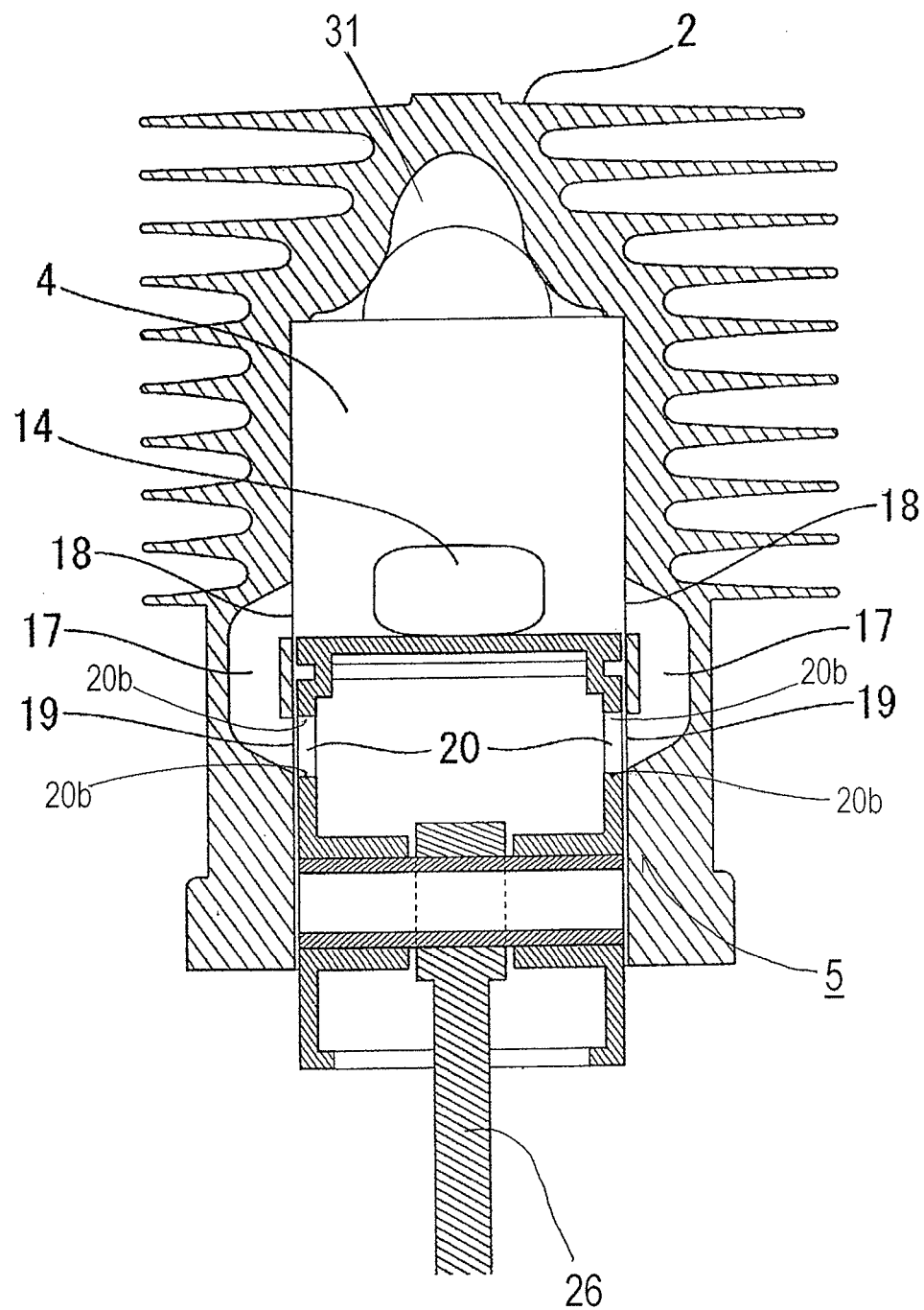
FIG. 3 shows an elevated view in section of the engine taken along a line III-III of FIG. 2.

FIG. 3 is a cross sectional view cutting the engine 1 by a line III-III in FIG. 2. As shown in FIG. 3, a pair of scavenge air passages 17 are formed in the inner portion of the cylinder block 2 so as to be symmetrical with respect to the cylinder axis 34. The scavenge air passage 17 communicates with the cylinder 4 via a scavenge air port 18 formed in an end portion close to a top dead center of the cylinder. Further, a scavenge air inflow port 19 is formed in a bottom dead center side of the scavenge air passage 17. In other words, the scavenge air passage 17 is a gas passage connecting the scavenge air port 18 and the scavenge air inflow port 19 in an airtight manner. An upper edge (an edge close to the top dead center) of the scavenge air port 18 is formed at a position which is lower than the upper edge of the exhaust port 14.

Further, since a lower face of the piston 5 is opened, an internal space of the piston 5 communicates with the crank chamber 6. Further, a scavenge air communication port 20 is formed in a side portion of the piston 5, and an internal space of the piston 5 communicates with an external portion via the scavenge air communication port 20. Further, when the piston 5 moves down and the cylinder 4 communicates with the scavenge air port 18, the scavenge air communication port 20 starts being in communication with the scavenge air inflow port 19, and when the piston 5 exists in the vicinity of the bottom dead center, the scavenge air communication port 20 communicates with the scavenge air inflow port 19 in a fully opened state.

Figure 4:
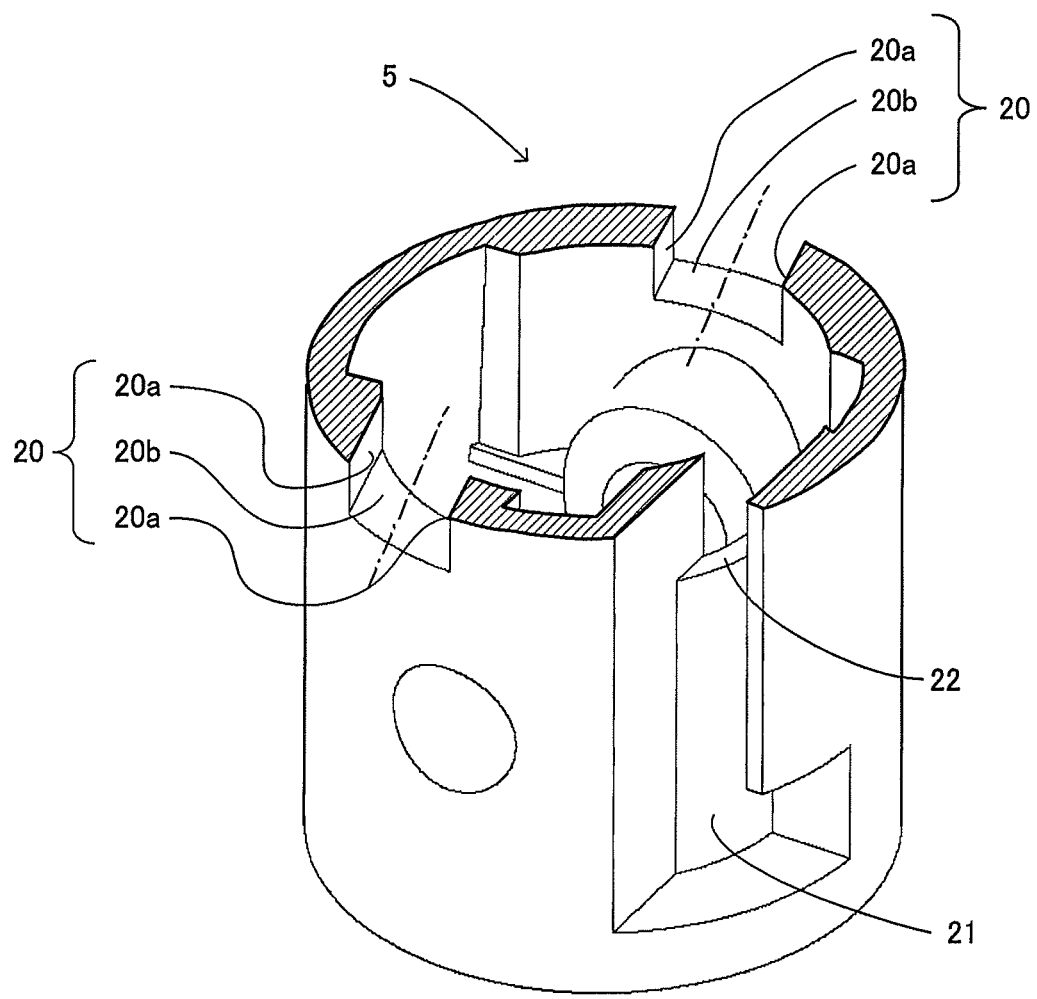
FIG. 4 is a perspective view of a piston of the engine.

FIG. 4 is a perspective cross sectional view of the piston 5, and illustrates by removing a portion above a line IV-IV in FIG. 2 for convenience of explanation. As shown in FIG. 4, an L-shaped groove portion 21 is formed in an outer circumference surface in a side portion of the piston 5. Further, since a lead air inflow port 22 is provided above the piston 5, the groove portion 21 is communicated with the internal space of the piston 5 via the lead air inflow port 22.

Figure 5:
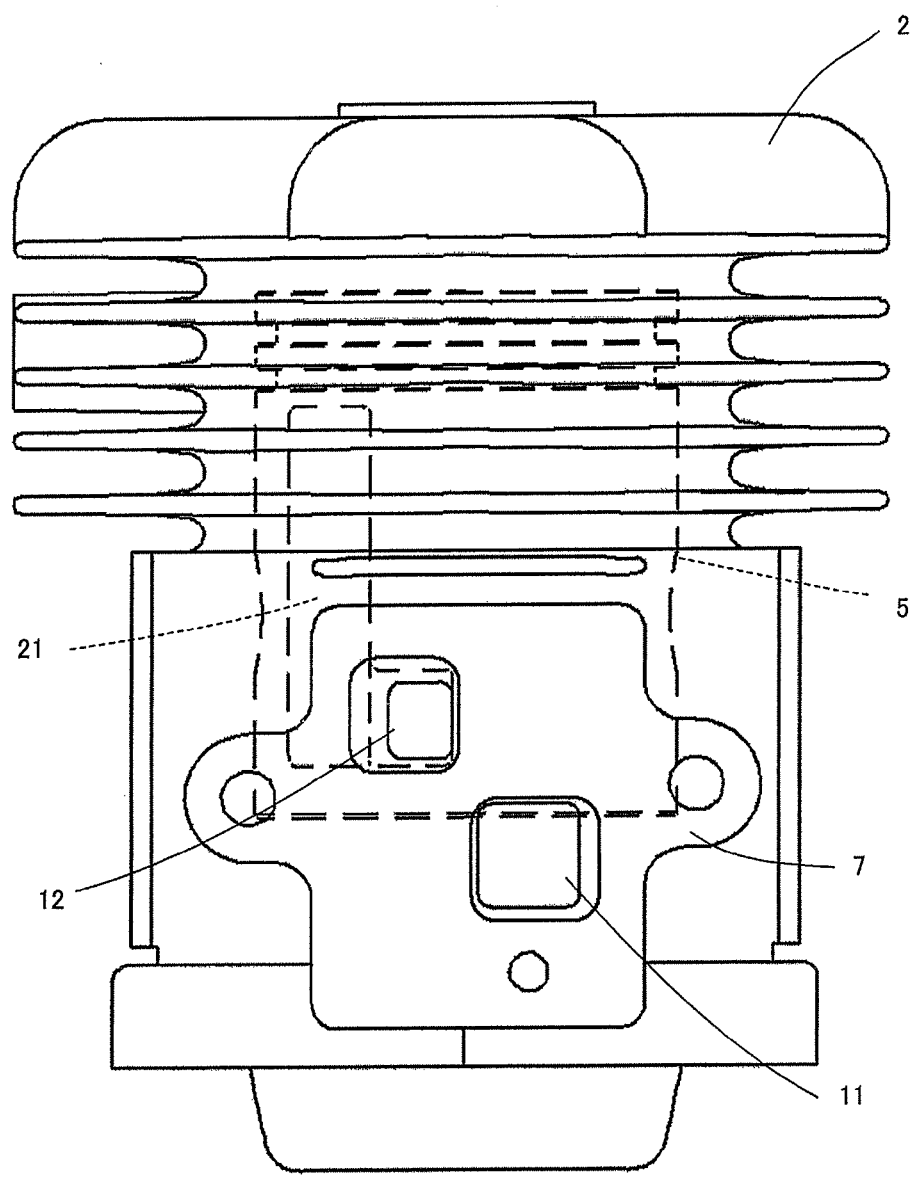
FIG. 5 shows a principal part of the engine as viewed from a direction V in FIG. 2.

FIG. 5 shows the principal part of the engine 1 as viewed from a direction V in FIG. 2, and shows a state in which the piston 5 exists at a top dead center. As shown in FIG. 5, the intake port 11 and the lead air port 12 are arranged so as to be shifted in their positions from each other vertically (a direction of an axis 34) and laterally (a circumference direction of the cylinder 4). Specifically, the lead air port 12 is arranged so as to communicate with the groove portion 21 of the piston 5 in the case that the piston 5 is positioned in the vicinity of the top dead center (at a position shown by a broken line in the drawing). Further, the intake port 11 does not overlap the groove portion 21 of the piston 5 even if the piston 5 moved up and down.

Figure 6:
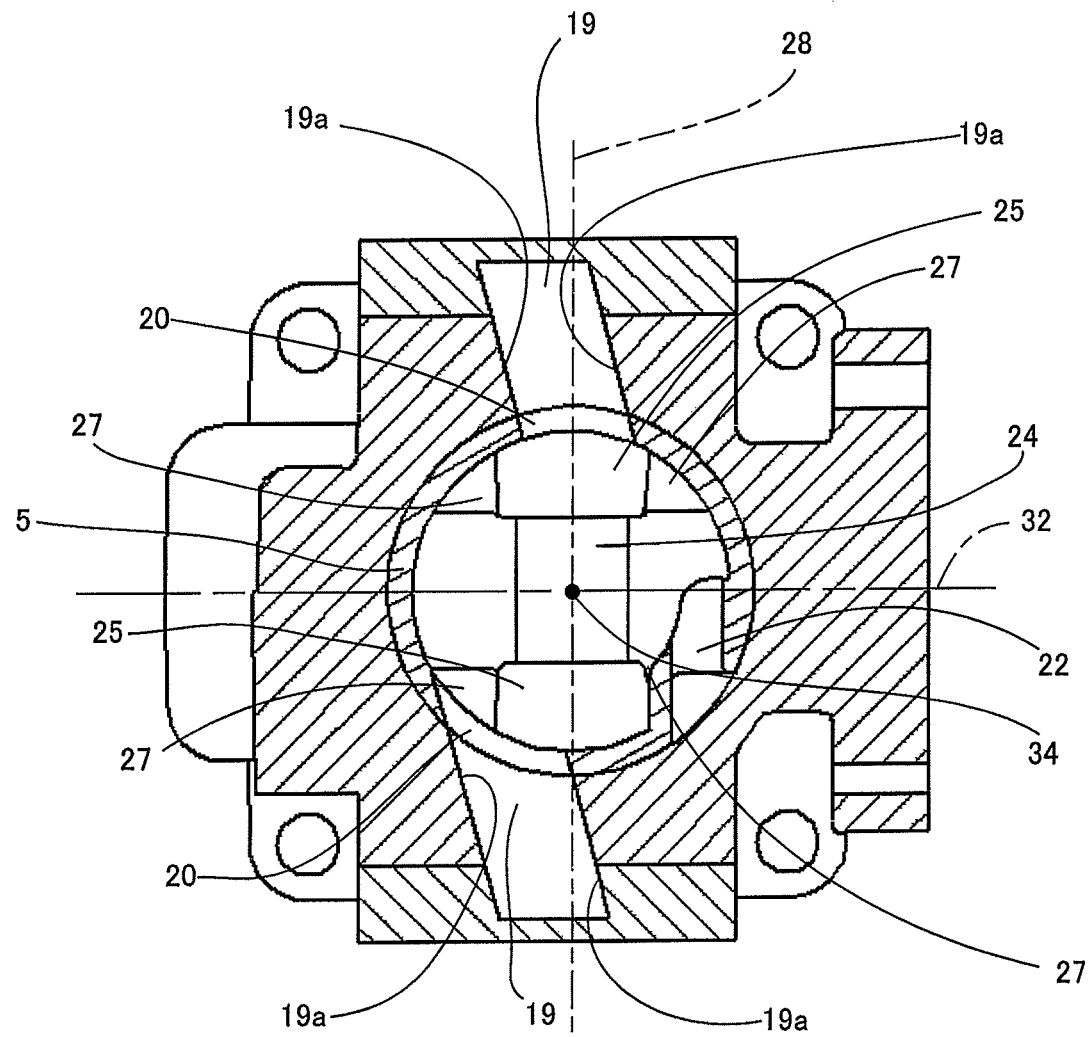
FIG. 6 is a transversal cross sectional view cutting the principal part of the engine by a line IV-IV in FIG. 2.

FIG. 6 is a cross sectional view cutting the engine 1 by a line IV-IV in FIG. 2. As shown in FIG. 6, a piston pin boss portion 25 is provided in the internal space of the piston 5, and holds a piston pin 24. Further, the piston pin boss portion 25 protrudes toward a center of the piston 5. Two symmetrically-provided pairs of (totally four) ribs 27 are in both side portions of each of the piston pin boss portions 25 so as to be symmetrical to a piston pin axis 28. Further, the rib 27 is formed as a fan shape, and extends toward an inner peripheral surface of the piston 5.

Further, as shown in FIG. 6, as viewed in the engine 1 from the direction of the cylinder axis 34 (illustrating a cross section by cutting by a plane which is vertical to the cylinder axis 34), an axis of the scavenge air communication port 20 comes into line with an axis of the scavenge air inflow port 19 which communicates with the scavenge air communication port 20. Further, there are two sets of the scavenge air communication ports 20 and the scavenge air inflow ports 19, and they are arranged so as to oppose to each other beyond a plane 32 in-between which passes through the axis 34 of the cylinder 4 and is vertical to the piston pin axis 28. Accordingly, combustion gases flowing into (flowing backward to) the internal space of the piston 5 while passing through two scavenge air communication ports 20 from the cylinder 4 flow in inverse directions to each other. Further, the axes of two scavenge air communication ports 20 are offset from each other. In other words, these two axes are in parallel to each other and are arranged at a predetermined interval. Further, the axes are inclined to the piston pin axis 28.

In this case, the "axis" of the scavenge air inflow port 19 or the scavenge air communication port 20 is a geometrical center axis of the scavenge air inflow port 19 or the scavenge air communication port 20, and is an axis which is representative of a flow line of the gas passing through the scavenge air inflow port 19 or the scavenge air communication port 20. In other words, the combustion gas flowing into (flowing backward to) the internal space of the piston 5 through the scavenge air communication port 20 flows in a direction along the axis of the scavenge air communication port 20. For example, an intermediate line of right and left ridge lines 19a of the scavenge air inflow port 19 corresponds to the axis of the scavenge air inflow port 19 or the scavenge air communication port 20.

Here, a description will be given of a flow of the gas in one cycle of the engine 1 constructed as mentioned above. Since the internal space of the piston 5 communicates with the crank chamber 6, the pressure in the internal space of the piston 5 is lowered in the same manner as the pressure within the crank chamber 6 (comes to a negative pressure with respect to an atmospheric air) at a time when the piston 5 rises toward the top dead center from the bottom dead center. Accordingly, the air-fuel mixture flows into the crank chamber 6 through the intake passage 9 of the carburetor 8 and the intake port 11, until the intake port 11 is closed after the start of opening.

At this time, as shown in FIG. 5, the groove portion 21 and the lead air passage 10 come to communicate with each other via the lead air port 12 as long as the groove portion 21 formed in the outer circumference surface of the piston 5 overlaps the lead air port 12 (until the piston 5 reaches the top dead center, the overlapping is cancelled and the lead air port 12 is closed from a moment of the start of overlapping). Accordingly, on the basis of a pressure difference between internal and external sides, the lead air flows into the internal space of the piston 5 from the lead air passage 10 through the lead air port 12.

Further, as shown in FIG. 6, four ribs 27 are formed in the internal space of the piston 5 so as to close the internal space by the piston pin boss 25. Accordingly, the internal space of the piston 5 closer to the combustion chamber than the rib 27 is filled with the lead air. In other words, in an intake stroke of the engine, the lead air is sucked to the internal space of the piston 5 above the rib 27, and at the same time, the air-fuel mixture is sucked into the crank chamber 6. On the other hand, since the combustion chamber 31 of the cylinder 4 is filled with the air-fuel mixture, the air-fuel mixture is burnt so as to come to a high-pressure combustion gas, when the piston 5 reaches a portion which is in the vicinity of the top dead center, and the air-fuel mixture is ignited by an ignition plug. Since the high-pressure combustion gas pushes down the piston 5, the pressures in the internal space of the piston 5 and the crank chamber 6 rise.

Further, if the piston 5 comes down, the exhaust port 14 is first opened, and the combustion gas within the cylinder 4 flows out of the exhaust passage 13 to the external portion. Subsequently, the scavenge air port 18 is opened. At this time, the scavenge air communication port 20 of the piston 5 and the scavenge air inflow port 19 of the cylinder 4 starts overlapping, and the internal space of the piston 5 and the cylinder 4 communicate with each other. Just after the scavenge air port 18 is opened, the combustion gas flows backward to the internal space of the piston 5 through the scavenge air port 18, the scavenge air passage 17 and the scavenge air communication port 20 because the pressure in the combustion chamber is higher than the pressure in the inner portion of the piston 5 and the crank chamber 6.

As mentioned above, two scavenge air communication ports 20 are arranged in the piston 5 in an opposing manner, and the axes of the scavenge air communication ports 20 are offset from each other. Therefore, the combustion gases flowing backward into the piston 5 from two scavenge air communication ports 20 flow while whirling along the inner wall surface of the piston 5 (whirls in a clockwise direction in FIG. 6). In other words, since the backward flow of the combustion gas is retained in the upper portion of the internal space of the piston 5 by flowing while whirling along the inner wall surface of the piston 5. Further, it is possible to inhibit the combustion gases flowing backward from the scavenge air communication port 20 from coming into collision with each other so as to generate the flow heading for the below of the piston 5, and flowing into the air-fuel mixture within the crank chamber 6. Further, since four fan-shaped ribs 27 are formed in the internal space of the piston 5, the internal space of the piston 5 is partly closed. Accordingly, it is possible to more effectively retain the combustion gas in the upper portion of the internal space of the piston 5.

When the backward flow of the combustion gas to the internal space of the piston 5 is finished, the combustion gas retained while whirling above the internal space of the piston 5 flows back into the cylinder 4 from the scavenge air port 18 through the scavenge air communication port 20, the scavenge air inflow port 19 and the scavenge air passage 17. Further, the lead air flows into the cylinder 4, and pushes out the combustion gas within the cylinder 4 from the exhaust port 14 so as to perform scavenge. Accordingly, it is possible to effectively discharge the combustion gas. Further, the air-fuel mixture having a high concentration of fuel flows into the cylinder 4 following the lead air.

As mentioned above, since the engine 1 swirls the combustion gas flowing backward to the internal space of the piston 5 above the internal space of the piston 5 so as to retain there, it is possible to prevent the combustion gas from flowing backward to lower the concentration of the air-fuel mixture in the crank chamber 6, and it is further possible to discharge the backward flow of the combustion gas in an early stage. Therefore, it is possible to effectively suppress the output reduction. Further, since the lead air flows into the cylinder 4 in advance, and the air-fuel mixture flows therein subsequently, it is possible to effectively reduce a blow-by of the air-fuel mixture from the exhaust port 14. Further, since the lead air and the air-fuel mixture taken from the exterior pass through the inner portion of the piston 5, it is possible to effectively cool the piston 5.

In this case, in the embodiment mentioned above, there is shown the example in which the axes come into line with each other between the scavenge air inflow port 19 and the scavenge air communication port 20 connected thereto, and these axes are inclined with respect to the piston pin axis 28. However, the shapes and the arrangements of the scavenge air inflow port 19 and the scavenge air communication port 20 are not limited to those mentioned above.

Figure 7:
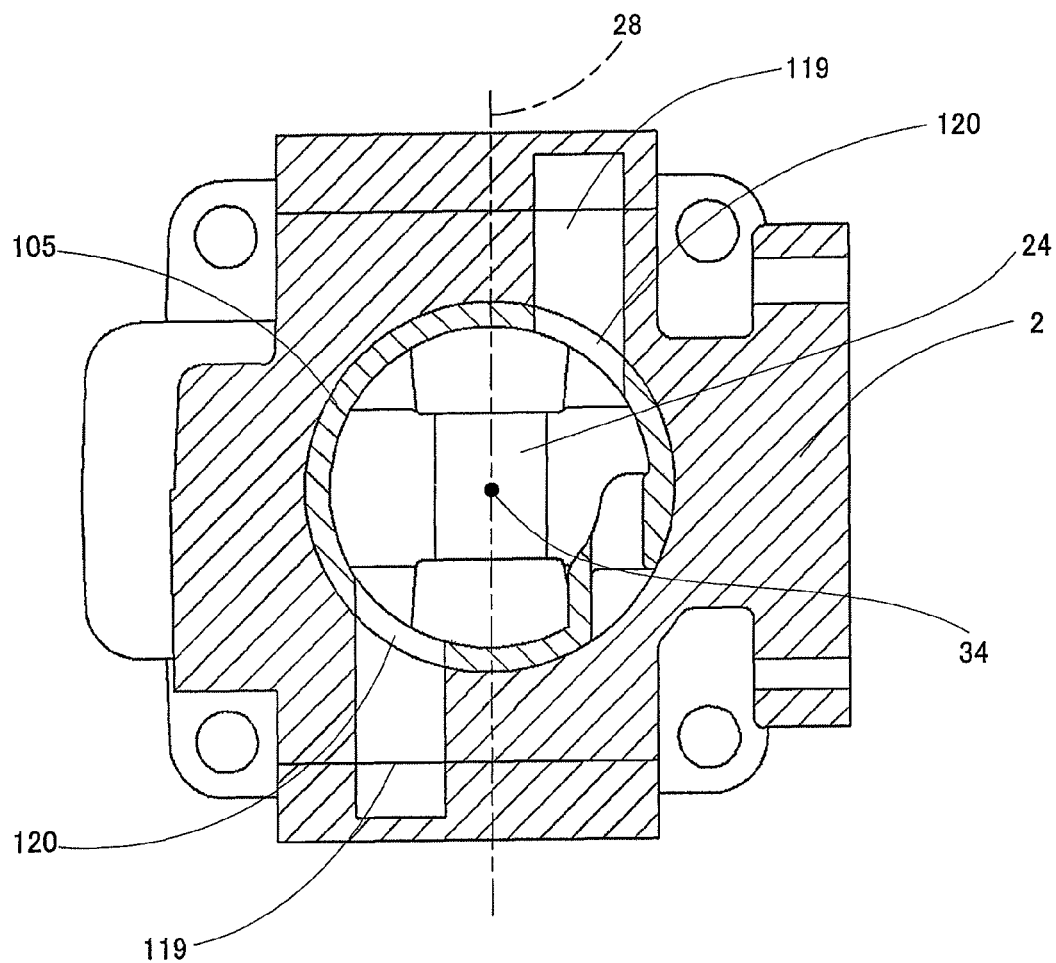
FIG. 7 is a transversal cross sectional view, corresponding to FIG. 6, of a principal part of an engine which is another embodiment of the present invention.

For example, as shown in FIG. 7, the whirling flow generating section (the retention section) may be offsetting axes of a scavenge air inflow port 119 and a scavenge air communication port 120 connected thereto in parallel to the piston pin axis 28. In this case, the combustion gas flowing backward into a piston 105 from each of a pair of scavenge air communication ports 120 flows while whirling along an inner wall surface of the piston 105, and are retained in an upper portion of an internal space of the piston 105. As a result, it is possible to inhibit the combustion gas from flowing into the crank chamber 6 and contaminating the air-fuel mixture within the crank chamber 6.

Figure 8:
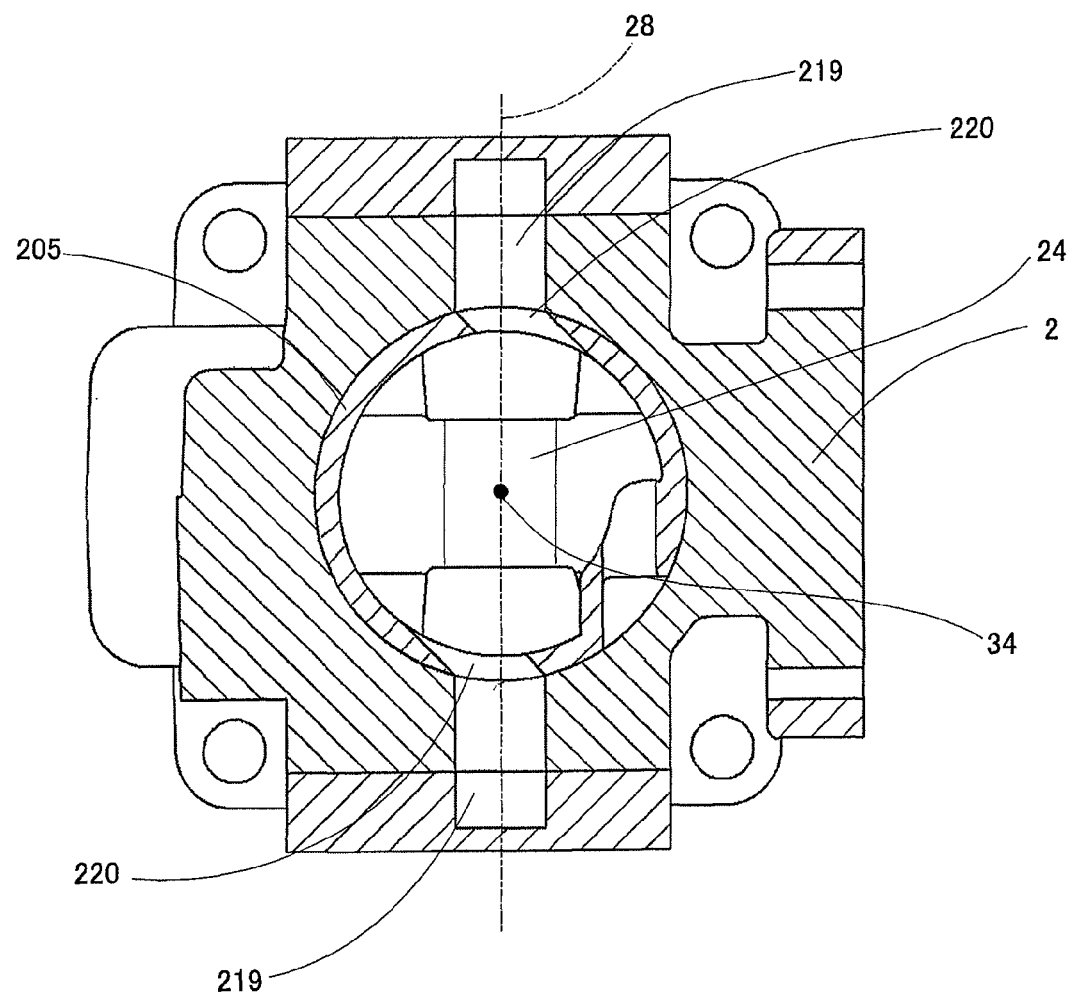
FIG. 8 is a transversal cross sectional view, corresponding to FIG. 6, of a principal part of an engine which is yet another embodiment of the present invention.

Further, as shown in FIG. 8, the whirling flow generating section (the retention section) may be constructed by arranging a pair of scavenge air inflow ports 219 symmetrically to the cylinder axis 34 so as to form in such a manner that axes of the both come into line with each other, and arranging axes of two scavenge air communication ports 220 so as to be offset from each other by inclining the axes of the scavenge air communication ports 220 with respect to the axes of the scavenge air inflow ports 219. In this case, the combustion gas flowing backward into the piston 205 from each of a pair of scavenge air communication ports 220 flows while whirling along an inner wall surface of the piston 205, are retained in an upper portion of an internal space of the piston 205, and are inhibited from flowing into the crank chamber 6. In this case, since the effect mentioned above can be obtained only by inclining the axes of the scavenge air communication ports 220 with respect to the axes of the scavenge air inflow ports 219, it is possible to improve an engine performance at a lower cost.

Figure 9:
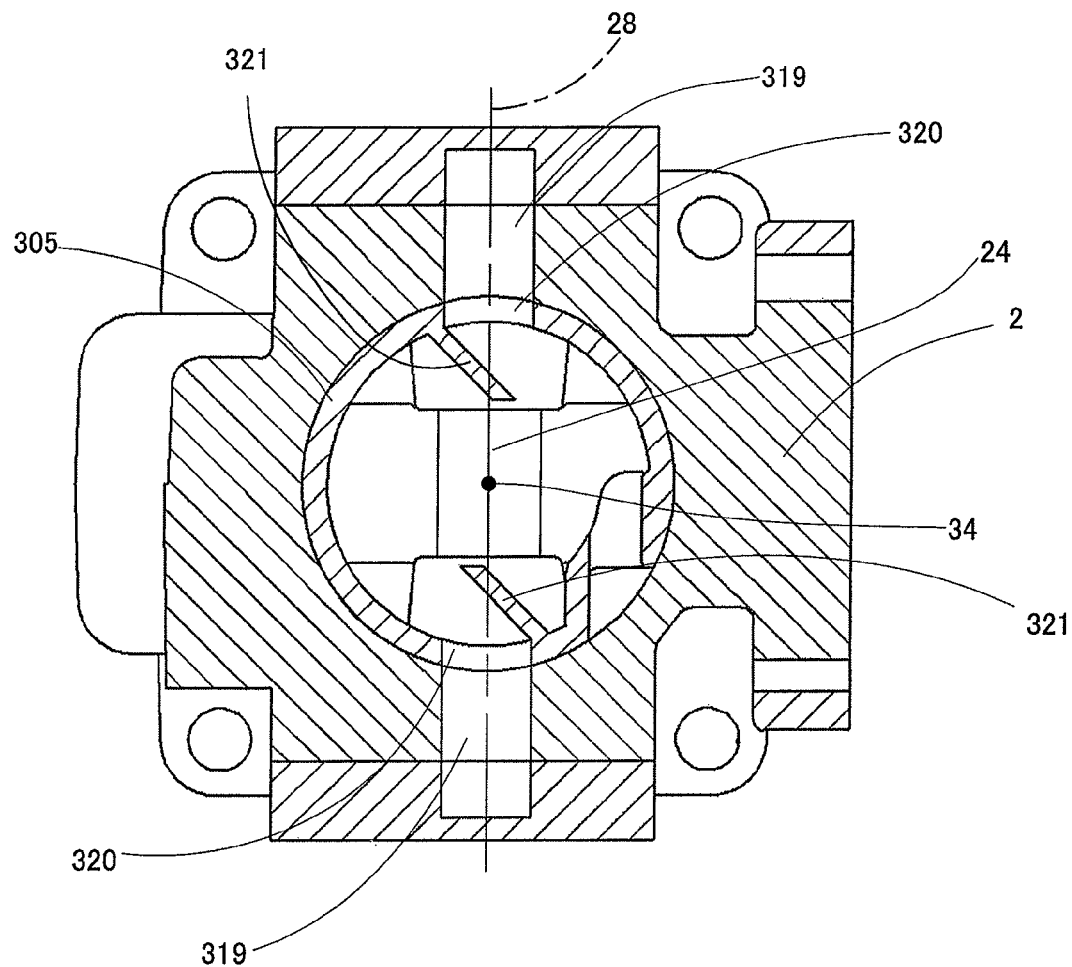
FIG. 9 is a transversal cross sectional view, corresponding to FIG. 6, of a principal part of an engine which is still another embodiment of the present invention.

Further, as shown in FIG. 9, the whirling flow generating section (the retention section) may be constructed by arranging a pair of scavenge air inflow ports 319 and a pair of scavenge air communication ports 320 symmetrically, with respect to the cylinder axis 34 so as to form in such a manner that axes of the both come into line with each other, and providing ribs 321 having at least the same length as the scavenge air communication port 320 in the axial direction 34 of the cylinder 4, covering an opening of the scavenge air communication port 320 from an end portion in a circumference direction of the scavenge air communication port 320 and protruding in the same circumference direction (counterclockwise direction in FIG. 9) diagonally toward an inner portion of a piston 305, each in the vicinity of the scavenge air communication ports 320 in an internal space of the piston 305. In other words, the internal space of the piston 305 is provided with the rib 321 extending from a right end of the lower scavenge air communication port 320 toward a left diagonally upward direction, and is provided with the rib 321 extending from a left end of the upper scavenge air communication port 320 toward a right diagonally downward direction. The rib 321 serves as a flow guide vane guiding the flow of the combustion gas flowing backward to the internal space of the piston 305 from the scavenge air communication port 320 in a clockwise direction along the inner wall surface of the piston 305. In other words, the rib 321 guides the combustion gas flowing from two scavenge air communication ports 320 into the internal space of the piston 305 and offsets the flow lines of the both from each other. Accordingly, since the backwardly flowing combustion gas is retained while whirling above the internal space of the piston 305, it is possible to inhibit the combustion gas from flowing into the crank chamber 6. Further, even in this case, since the effect mentioned above can be obtained only by forming the rib 321 in the inner portion of the piston 305, it is possible to improve the engine performance at the lower cost. In this case, the rib 320 may be used by being combined with the piston 5, 105 or 205 in the other embodiments mentioned above.

Further, in each of the embodiments mentioned above, the opening direction or the opening axis of the scavenge air communication port 20 (120, 220 or 320) formed in the piston 5 (105, 205 or 305) into the cylinder 4 is formed horizontally (in parallel to the surface vertical to the cylinder axis 34), as is well shown in FIGS. 3 and 4. In other words, the upper and lower wall surfaces of the scavenge air communication port 20 (120, 220 or 320) are formed vertically to the cylinder axis 36. However, the shape of the scavenge air communication port 20 (120, 220, 320) is not limited to that mentioned above.

Figure 10:
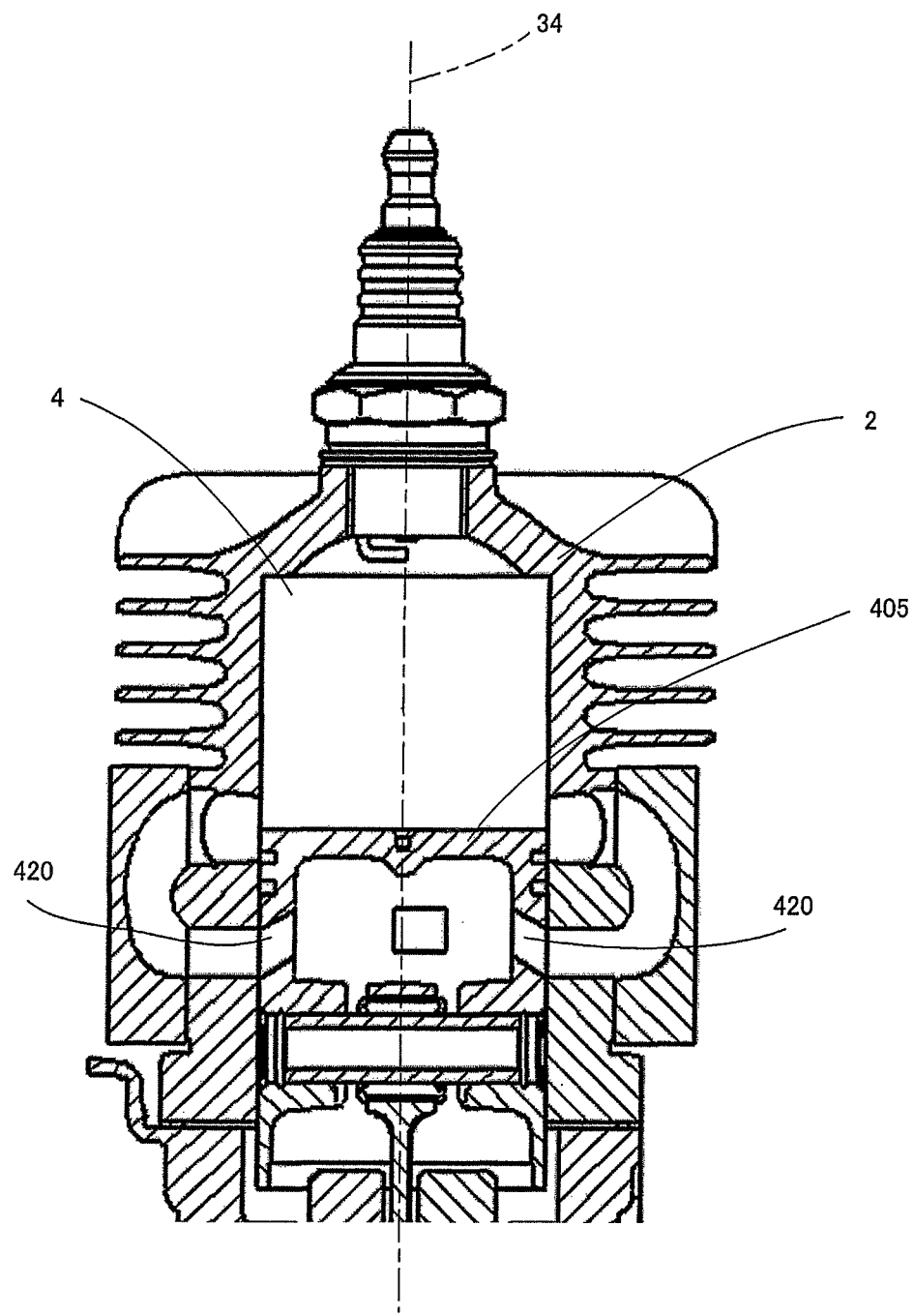
FIG. 10 is an elevated view in section of an engine showing another embodiment of the present invention.

For example, as shown in FIG. 10, it may be formed in such a manner that an opening direction or an opening axis of a scavenge air communication port 420 heads for a diagonally upward direction (a direction of the top dead center) within the cylinder 4. In other words, upper and lower wall surfaces of the scavenge air communication port 420 may be formed such that an inner peripheral side becomes higher than an outer peripheral side. The shape of the scavenge air communication port 420 may be used by being combined with any of the scavenge air communication ports 20, 120, 220 and 320 in the embodiments mentioned above. In this case, since the combustion gas flowing backward from the scavenge air communication port 420 into the piston 405 flows toward an upper side within the piston 405, it is possible to more effectively retain the combustion gas in the upper portion of the internal space of the piston 405. Accordingly, it is possible to more effectively inhibit the combustion gas flowing backward to the internal space of the piston 405 from making an intrusion into the crank chamber 6.

The structure of the whirling flow generating section (retention section) is not limited to the one described above. The whirling flow generating section (retention section) may not be continuous with the scavenge air inflow port 19 or the air communication port 20. Further, the ribs extending downward from the upper portion of the inside of the piston may serve as such whirling flow generating section (retention section)

In this case, the engines 1 shown in the embodiments mentioned above are all constructed by the lead air type, that is, the stratified scavenge air two cycle engine; However, the applied subject of the present invention is not limited to the stratified scavenge air two cycle engines shown in the embodiments. The present invention can be applied to the other types of stratified scavenge air two cycle engines, and the other types of two cycle engines than the stratified scavenge air two cycle engine. Further, the present invention can be applied not only to the two cycle engine which supplies the power to the tool, but a two cycle engine which supplies a power to various machinery and appliances, vehicles, ships and crafts or the like. Further, the two cycle engine tool according to the present invention is not limited to the bush cutter. Further, the two cycle engine tool according to the present invention includes the other various tools such as a chain saw, a blower, and the like.

The present invention can be utilized as the two cycle engine and the tool provided with the two cycle engine.

Various embodiments and changes may be made thereunto without departing from the broad spirit and scope of the invention. The above-described embodiment is (embodiments are) intended to illustrate the present invention, not to limit the scope of the present invention. The scope of the present invention is shown by the attached claims rather than the embodiment (embodiments). Various modifications made within the meaning of an equivalent of the claims of the invention and within the claims are to be regarded to be in the scope of the present invention.

This application is based on Japanese Patent Application No. 2008-208284 filed on 12 Aug. 2008 and including specification, claims, drawings and summary. The disclosure of the above Japanese Patent Application is incorporated herein by reference in its entirety.

What is claimed is:

1. A two cycle engine comprising:
    a cylinder having an intake port introducing an air-fuel mixture into a crank chamber, an exhaust port discharging a combustion gas within a combustion chamber, a scavenge air port, a scavenge air inflow port, and a scavenge air passage by which the scavenge air port communicates with the scavenge air inflow port;
    a piston having an internal space and a scavenge air communication port, and structured such that the air-fuel mixture within the crank chamber flows into the combustion chamber from the internal space through the scavenge air communication port, the scavenge air inflow port, the scavenge air passage and the scavenge air port; and
    a retention section provided in the piston, wherein the retention section is configured to retain, in the vicinity of a top of the internal space, the combustion gas flowing backward to the internal space of the piston from the combustion chamber through the scavenge air port, the scavenge air passage, the scavenge air inflow port and the scavenge air communication port,
    wherein the retention section is constructed by a whirling flow generating section swirling, along a circumference direction in an inner side of the piston, the combustion gas flowing into the internal space through the scavenge air communication port.

2. The two cycle engine according to claim 1, wherein the whirling flow generating section is constructed by a pair of the scavenge air inflow ports arranged in such an opposing manner that the combustion gas flowing backward to the internal space flows in reverse direction to each other, and axes of the pair of scavenge air inflow ports are offset from each other as viewed from an axial direction of the cylinder.

3. The two cycle engine according to claim 1, wherein the whirling flow generating section is constructed by a pair of the scavenge air communication ports arranged in such an opposing manner that the combustion gas flowing backward to the internal space flows in a direction inverse to each other, and axes of the pair of scavenge air communication ports are offset from each other as viewed from an axial direction of the cylinder.

4. The two cycle engine according to claim 1, wherein the whirling flow generating section is constructed by a pair of the scavenge air communication ports arranged in such an opposing manner that the combustion gas flowing backward to the internal space flows in inverse direction to each other, and a flow guide plate arranged in the vicinity of the scavenge air communication port of the internal space is provided, and the flow guide plate guides the combustion gas in such a manner that the flows of the combustion gases flowing from a pair of the scavenge air communication ports are offset from each other as viewed from an axial direction of the cylinder.

5. The two cycle engine according to claim 1, wherein the scavenge air communication port has such an inclination that an end surface close to the internal space comes closer to a top dead center of the piston in comparison with an end surface close to the scavenge air inflow port.

6. The two cycle engine according to claim 1, wherein the scavenge air passage has such an inclination that the combustion gas flowing backward to the internal space from the scavenge air inflow port heads for a direction of a top dead center of the piston.

7. The two cycle engine according to claim 1, wherein a lead air port is further provided at a position which comes closer to a top dead center than the intake port of the cylinder, the piston is provided with the lead air port, a lead air flow path that is connected to the lead air port and introduces a lead air flowing from the lead air port to the internal space of the piston is further provided and the lead air flows into the cylinder from the scavenge air port through the scavenge air communication port, the scavenge air inflow port and the scavenge air passage, and, in succession, the air-fuel mixture within the crank chamber flows into the cylinder from the scavenge air port through an inner portion of the piston, the scavenge air communication port, the scavenge air inflow port, and the scavenge air passage while the scavenge air communication port and the scavenge air inflow port overlap in an exhaust stroke.

8. A two cycle engine tool comprising the two cycle engine according to any one of claims 1 and 2 to 7.

9. A two cycle engine comprising:
    a cylinder having an intake port introducing an air-fuel mixture into a crank chamber, an exhaust port discharging a combustion gas within a combustion chamber, a scavenge air port, a scavenge air inflow port, and a scavenge air passage by which the scavenge air port communicates with the scavenge air inflow port;
    a piston having an internal space and a scavenge air communication port, and structured such that the air-fuel mixture within the crank chamber flows into the combustion chamber from the internal space through the scavenge air communication port, the scavenge air inflow port, the scavenge air passage and the scavenge air port; and
    a retention section provided in the piston, and retaining, in the vicinity of a top of the internal space, the combustion gas flowing backward to the internal space of the piston from the combustion chamber through the scavenge air port, the scavenge air passage, the scavenge air inflow port and the scavenge air communication port,
    wherein the scavenge air communication port opens to the internal space of the piston at one end thereof and opens to an outer circumferential surface of the piston at the other end thereof, so that the internal space of the piston communicates with an external portion via the scavenge air communication port, and
    the scavenge air communication port has such an inclination relative to a surface vertical to a cylinder axis that a wall surface of the one end of the scavenge air communication port comes closer to a top dead center of the piston in comparison with a wall surface of the other end of the scavenge air communication port.

* * * * *